(No Model.)
C. J. McDERMOTT.
RESTORING RUBBER WASTE.
No. 262,079. Patented Aug. 1, 1882.
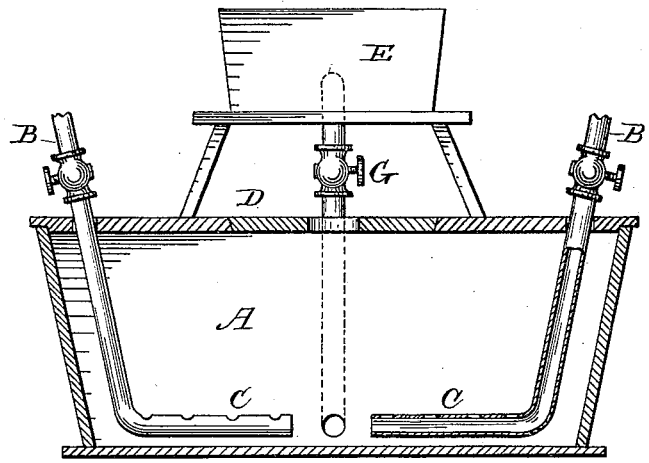
Witnesses:
E. E. Masson
W. B. Masson
Inventor:
Charles J. McDermott
by A. Pollok
his attorney.

UNITED STATES PATENT OFFICE.

CHARLES J. McDERMOTT, OF SANDY HOOK, CONN., ASSIGNOR TO THE NEW YORK BELTING AND PACKING COMPANY, OF CONNECTICUT.

RESTORING RUBBER-WASTE.

SPECIFICATION forming part of Letters Patent No. 262,079, dated August 1, 1882.

Application filed July 1, 1882. (No model.)

*To all whom it may concern:*

Be it known that I, CHARLES JOSEPH MC-DERMOTT, of Sandy Hook, Fairfield county, Connecticut, have invented a new and useful Improvement for Restoring Waste Rubber, which is fully set forth in the following specification.

This invention has reference to a method of treating fibrous rubber waste or scrap—such as old boots and shoes, old belting, the vulcanized and unvulcanized scraps—made in rubber factories, and the like.

Briefly, the improved process consists in boiling the rubber waste or scrap with dilute acid—say sulphuric acid at 12° Baumé—by means of live steam injected into the mass, and in assisting the action of the acid by the addition of a salt of chromium, such as bichromate of potash and manganese.

An apparatus suitable for use in carrying out this invention is shown in vertical section and elevation in the accompanying drawing, which forms part of this specification.

A is a lead-lined tub, provided at each end with a steam-pipe, B, having branches C extending along the bottom and perforated so as to direct the steam toward the center of the vessel. A sectional cover, D, is provided, the central section having a hole for the escape of fumes that are generated.

E is a smaller lead-lined vessel, supported at a higher level and connected with the tub by means of a pipe, F, having a cock, G. The vessel E forms an elevated reservoir for the sulphuric acid, which, by opening the cock G, can be allowed to run into the tub A. In the latter the fibrous waste or scrap is treated.

The manner of proceeding is as follows: Assuming tub A to be eight feet long by thirty inches wide and forty inches high, water is first poured in until it stands six inches deep. The reservoir E being filled with sulphuric acid of 66° Baumé, the cock G is turned and the acid is allowed to flow into the tub until the solution therein marks 12° Baumé. The rubber to be reclaimed is then put in—say six barrels of one hundred and seventy-five (175) pounds each. On top of this layer of rubber is sprinkled about eight (8) pounds of black oxide of manganese in powder. The charge of rubber is then completed by filling the tub therewith, the amount being about eight (8) barrels in addition to that first put in. Over the whole is poured a hot solution of bichromate of potash—say thirty (30) pounds of the solution—*i. e.*, water and salt together. The tub is now closed and steam admitted. After boiling thirty minutes or thereabout, it is necessary to admit more acid, so as to maintain the strength as near as may be at 12° Baumé. Two or three gallons will suffice. The steam is then renewed for twenty minutes, when the operation is completed, and the rubber, after washing and neutralization of the contained acid, is ready for use in the manufacture of rubber goods. When the acid is admitted the second time the acid is removed from immediately around the orifice of the inlet-pipe, and it is also expedient to use a spray of cold water to temper the strength of the acid, and thus to prevent it from burning the rubber. For the quantity of stock indicated about five hundred and twenty-five (525) pounds is requisite. The material before treatment should be "cracked"—that is, reduced to small pieces by toothed rollers, forming what is known as a "cracker."

It is preferred, on the score of economy, to use commercial sulphuric acid; but other acids—such as nitric or muriatic acid—may be used instead. The best proportions for these acids are somewhat different from the above; but they can be readily ascertained by experiment. The acid is used in such a state of dilution as not to burn the rubber, but still having sufficient strength to act energetically upon the fiber. Its action is very much assisted by the injection of live steam, the effect of which is to insure a more intimate, thorough, and speedy contact of the acid with the fiber, and by the bichromate of potash, which in the presence of the free acid fumes violently and rapidly destroys the fiber, particularly animal fiber, and it is also assisted by the manganese. The dilution of the acid, besides diminishing the loss of rubber, renders easier the washing and neutralizing in the wash-tub.

Having now fully described my said inven- tion, and the manner of carrying the same into effect, what I claim is—

1. The method of recovering rubber by treating the waste or scrap with a compound of chromium—such as bichromate of potash—in connection with nitric acid, substantially as described.

2. The method of recovering rubber by boiling the waste or scrap in dilute acid by means of live steam injected into the mass, substantially as described.

3. In the treatment of fibrous rubber waste or scrap with acid, the addition of manganese to the bath, substantially as described.

4. The method of treating fibrous rubber waste or scrap by boiling the same in a solution of acid, bichromate of potash, and manganese by means of live steam injected into the mass, substantially as described.

In testimony whereof I have signed this specification in the presence of two subscribing witnesses.

CHAS. J. McDERMOTT.

Witnesses:
A. POLLOK,
VICTOR E. BURKE.